United States Patent [19]

Jangaard

[11] Patent Number: 4,815,206
[45] Date of Patent: Mar. 28, 1989

[54] DOOR HINGE APPLICATOR

[75] Inventor: Erling S. Jangaard, Maderia Beach, Fla.

[73] Assignee: Ruvo Automation Corporation, Largo, Fla.

[21] Appl. No.: 177,457

[22] Filed: Apr. 4, 1988

Related U.S. Application Data

[62] Division of Ser. No. 932,265, Nov. 19, 1986, Pat. No. 4,782,588.

[51] Int. Cl.$^4$ ............................................. B23Q 7/10
[52] U.S. Cl. .......................................... 29/810; 29/809
[58] Field of Search ...................... 29/526 R, 787, 809, 29/810; 81/57.23, 57.37, 430, 433; 198/389, 420, 424, 463.6, 493; 221/1, 93, 165, 263, 278; 414/114, 117, 222, 224, 786, 787

[56] References Cited

U.S. PATENT DOCUMENTS

| | | | |
|---|---|---|---|
| 3,772,757 | 11/1973 | Goldstein | 29/810 X |
| 3,889,343 | 6/1975 | Miller et al. | 29/809 |
| 4,100,661 | 7/1978 | Cheak | 29/787 X |

*Primary Examiner*—Carl E. Hall
*Assistant Examiner*—Andrew E. Rawlins
*Attorney, Agent, or Firm*—Stanley M. Miller

[57] ABSTRACT

A machine that takes screws out of a hopper and delivers them to a screw driving station where they are driven by motor operated screw driver members to secure a hinge to a door and a jamb. Inside the hopper, a screw lifting member engages, lifts, aligns and delivers individual screws to a hopper discharge station. Pressurized air blows the screws from their respective discharge stations onto tracks, there being one track associated with each discharge station. Elongate transfer tubes positioned at the discharge end of the tracks deliver the screws to a movable head member which upon receiving a charge of screw members moves downwardly and inwardly to a fixed position screw driving station where a door and jamb are positioned. Screw driver members are brought into driving relation to associated screws by horizontally inward movement of a motor that rotates the screw driver members. The downward and inward stroke separates the head member from the transfer tubes and a subsequent return stroke returns the head member to the discharge end of the transfer tubes so that another set of screw members may be charged into the head member. Accordingly, the transfer tubes do not move during machine operation.

11 Claims, 4 Drawing Sheets

DOOR HINGE APPLICATOR

This application is a division of application Ser. No. 06/932,265, filed Nov. 19, 1986 now U.S. Pat. No. 4,782,588 issued Nov. 8, 1988.

BACKGROUND OF THE INVENTION

1. Field of the Invention

This invention relates, generally, to automatic door hinge applicators, and more particularly relates to a machine that lifts screws out of a hopper, delivers them to a screw driving station, and drives them into fastening relation to a hinge having flaps overlying a door and a door jamb.

2. Description of the Prior Art

Door hinges have a central post and a pair of pivotally mounted hinge flaps that extend therefrom. Typically, each flap is provided with three holes formed therein so that screws extending therethrough can unit the hinge to a door and a door jamb.

Door installers can laboriously accomplish the fastening of the hinge to the door and jamb manually, of course, but inventors have developed several machines capable of performing the job faster and with greater uniformity of result.

Typically, the machines of the prior art include a hopper for storing screw members and a transfer means for delivering screws from the hopper to a screw driving station.

The transfer means are usually in the form of elongate transfer tubes that reciprocate up and down between hinge fastening cycles of the machine; as a result, the transfer tubes weaken and break due to their continual flexing.

The art has also failed to develop an efficient means for removing screw members from their hopper.

The art of automatic door hinge applicators has not reached its full development, and is is a primary object of this invention to provide a number of important innovations.

SUMMARY OF THE INVENTION

The present pioneering invention is not subject to the drawbacks of the prior art devices for fastening hinges to doors and door jambs.

It includes many novel features, including a hopper member having a unique means for lifting individual screw members from the pile of screws deposited into the hopper.

The lifting means is reciprocally mounted within the hopper and reciprocates in a vertical plane; it is capable of lifting not only screws but any article having an engageable head such as a rivet, a bolt, or even a washer.

The lifting means includes a slot that engages the head of a screw and lifts it up from the pile of screws to deliver it to a hopper discharge station. Pressurized air blows the screw from the discharge station to a track which in turn delivers it via an escapement mechanism to an elongate, fixed position transfer tube.

Pressurized air propels the screw down its transfer tube to a screw driving station where said screw is centered by a screw-positioning device with respect to an associated hole formed in a hinge flap.

A linkage means is operative to drive a screw driver member which in turn drives the screw into its seated position. The position of the transfer tube is not changed during any portion of the machine's operation and thus the lifetime of the tube is extended.

There are a plurality of lifting means in the hopper, preferably six since six screws are required to fasten a typical hinge to a door and jamb. There are as many tracks and transfer tubes as there are screw lifting means. Moreover, once the screws are delivered to the screw driving station, a head holding six screw driver members is capable of driving all six of the screws home simultaneously so that hinges can be applied to doors and jambs at a high rate of speed.

An important object of this invention is to provide an automatic door hinge applicator having fixed position and thus long-lived transfer tubes.

Another important object is to advance the art of automatic hinge applicators by providing a lifting means that removes individual screws from a hopper.

Another object is to provide an improved escapement mechanism for delivering screws from their associated tracks to their transfer tubes.

A broad object is to pioneer the next generation of automatic door hinge applicators by disclosing breakthrough technology that represents a revolutionary advance in the art of machine design.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

Similar reference numerals refer to similar parts throughout the several views of the drawings.

DETAILED DESCRIPTION OF THE PREFERRED EMBODIMENT

Figure 1:
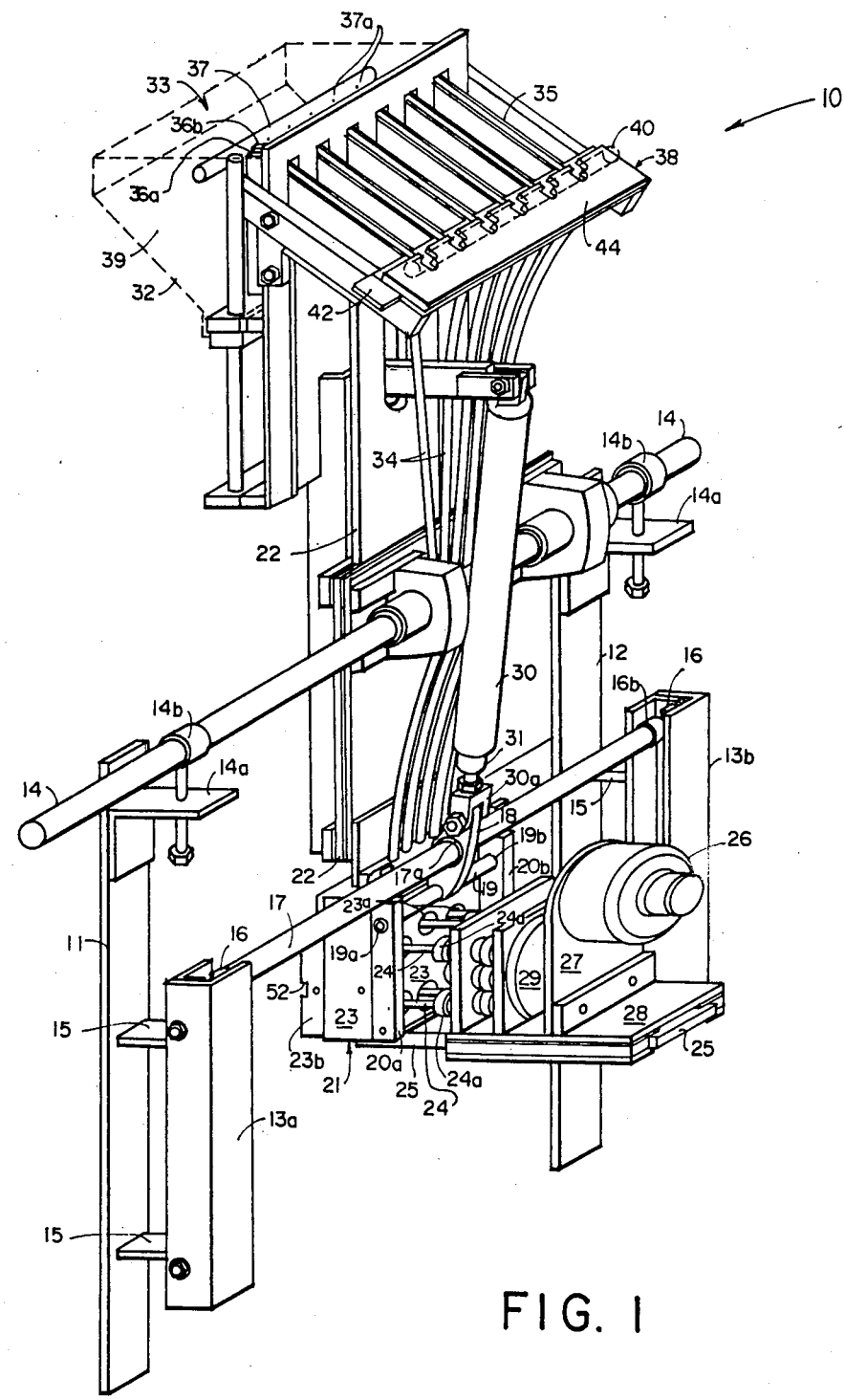
FIG. 1 is a perspective view of the novel hinge applying machine. The view is from the "front" of the machine so references in the text of this disclosure referring to "inward" refer to a motion into the paper.

Referring now to FIG. 1, it will there be seen that the novel automatic hinge applicator is designated by the reference numeral 10 as a whole.

Machine 10 includes a pair of laterally spaced, upstanding major frame members 11, 12 which provide the mounting means or base for support shaft 14 in the manner depicted which includes brace members 14a and collar members 14b. The remaining parts of machine 10 are ultimately supported by support shaft 14 as shown by FIG. 1.

A pair of channel-shaped gear housing members 13a, 13b are positioned parallel to and spaced forwardly of main frame members 11, 12 by vertically spaced, horizontally disposed brackets which are collectively designated 15.

An elongate rack gear member 16 is positioned within the channel of each housing 13a, 13b and is meshingly engaged by pinion gear members only one of which, 16b, appears in FIG. 1; it is visible in the channel formed by housing 13b which is positioned at the right hand side of FIG. 1.

A transversely disposed rod 17, hereinafter referred to as the lever lock idler shaft or simply the idler shaft, interconnects pinion gears 16. Idler shaft 17 is capable of reciprocating in a vertical plane attendant rotation of said pinion gears.

Lever lock member 18 is centrally apertured and is adjustably positioned anywhere along the extent of idler shaft 17, depending upon the location of the hinge pockets formed in the door and door jamb to which hinges are to be applied; bearing member 17a allows low friction pivoting or sliding movement therebetween.

The lower end of lever lock member 18 is also apertured as shown to receive lever lock pivot shaft 19 mid-length thereof but the connection between lever lock member 18 and pivot shaft 19 is fixed, not pivotal and hence rotation of lever lock member 18 imparts conjoint rotation of said pivot shaft 19; the opposite ends of pivot shaft 19 are pivotally secured to head sidewall members 20a, 20b by bearing members 19a, 19b. Head sidewall members 20a, 20b, form a part of a movably mounted head member, designated 21 as a whole.

Head member 21 further includes a head block member 23 which depends to and is thus suspendedly supported by a slide bar 22; reciprocation of slide bar 22 effects like movement of head member 21 and hence of sidewall members 20a, 20b, block members 23, and other parts of the invention to be hereinafter described.

A plurality of preferably six (6) bores, collectively designated 23a, extend completely through head block member 23; each bore 23a receives a screw driver member 24 as shown in FIG. 1. A motor means 26 rotatably drives bit holder members 24a and hence driver members 24.

Slide bar 22 supports head 21 as aforesaid; said slide bar oscillates in a vertical plane as plunger 31 of up-down cylinder 30 oscillates. Accordingly, head 21 and all of its associated parts moves up and down under the influence of plunger 31 as the machine follows its cycle of operation.

Figure 2:
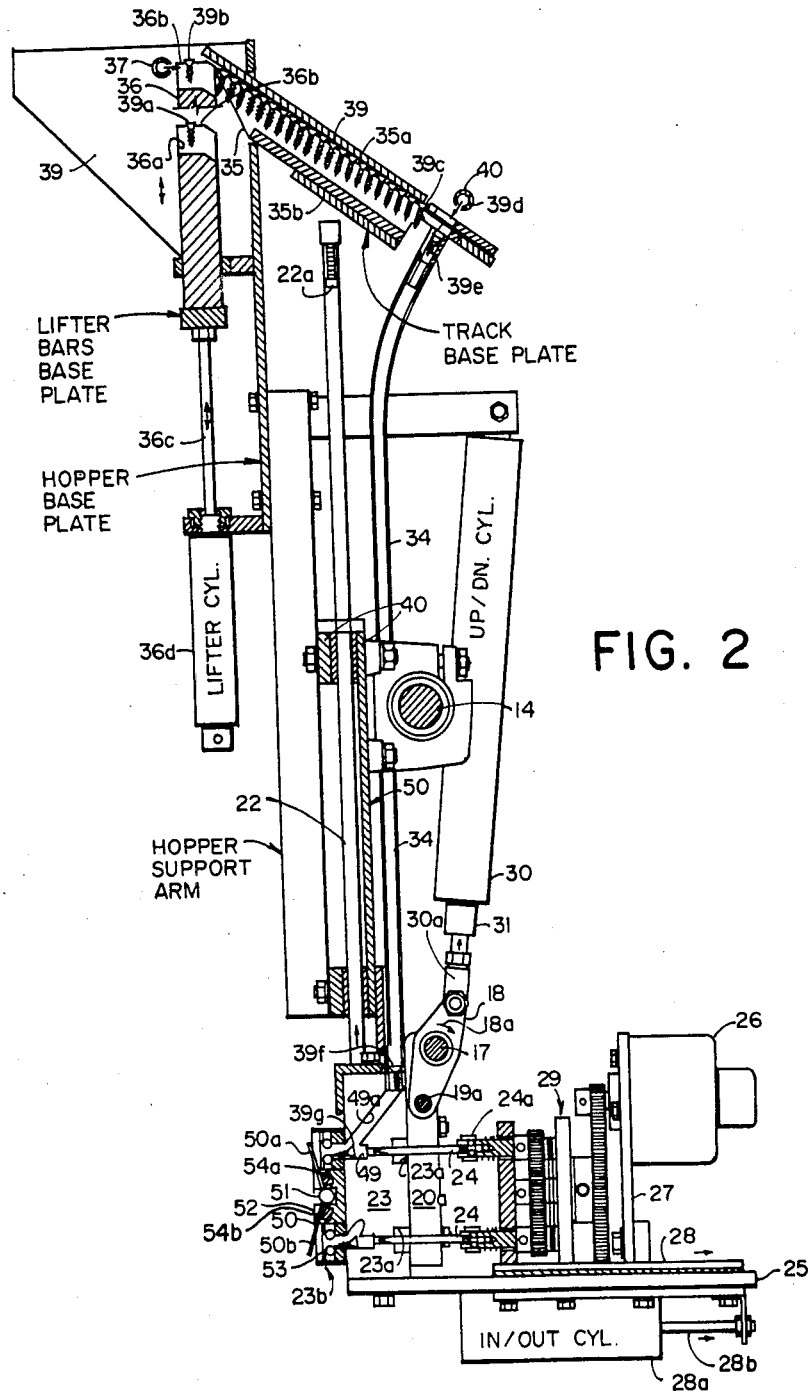
FIG. 2 is a sectional side view of the machine.

A down limit means 22a, shown in FIG. 2, limits the downward travel of slide bar 22; it is a bolt member and thus its axial adjustment provides a means whereby the down limit of slide bar 22 can be adjusted.

Figure 6:
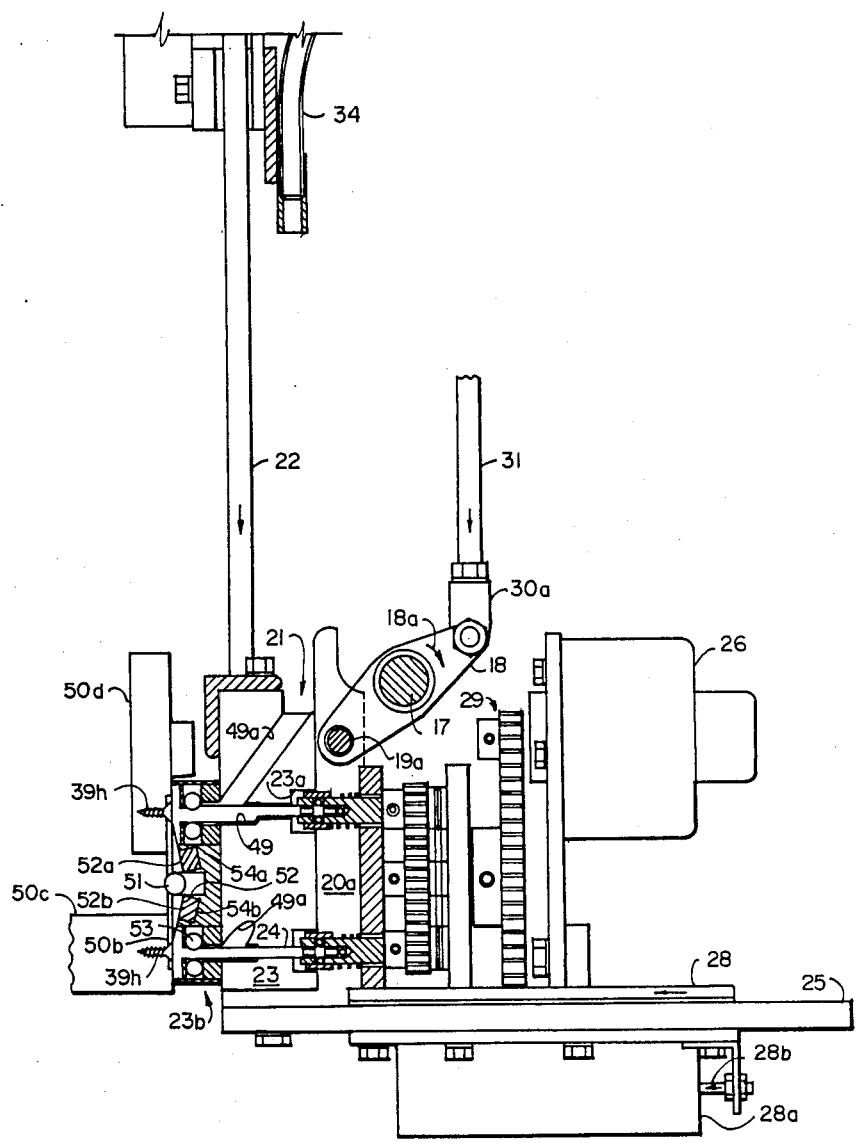
FIG. 6 is a side elevational, partly sectional view of some of the parts also shown in FIGS. 1 and 2, specifically the screw driving station of the machine, but showing the position of the screw driving station and its separation from the transfer tubes after the downward and inward stroke of the machine has been accomplished.

Head 21 also oscillates in a horizontal plane as is best understood in connection with FIGS. 2 and 6. Horizontally disposed plate 25 is fixedly secured to the bottom of head block member 23 and is thus vertically movable under the control of slide bar 22; plate 25 henceforth is referred to as driver guide bar 25.

Air motor 26 and its associated members are mounted atop plate 28 which has an interior channel formed therein to slideably receive driver guide bar 25 as shown.

An in-out cylinder 28a, shown in FIGS. 2 and 6, has a plunger 28b connected to plate 28 so that in and out oscillation of said plunger 28b, as denoted by the directional arrows appearing on said plunger 28b in FIGS. 2 and 6, effects simultaneous and corresponding oscillation of motor and plate 28 relative to head-carrying driver guide bar 25.

Head 21 undergoes a downward and inward stroke prior to the moment screws are driven home, and an outward and upward return stroke after a set of screws has been driven into a door and jamb. Both strokes are effected by plunger 31 in the manner hereinafter described.

Since motor 26 and its associated parts such as driver members 24 ultimately depend to slide bar 22, it should be clear that the down, in and up, out motions of the head member 21 result in conjoint motion of said motor 26 and drivers 24; the horizontal reciprocation of motor 26 and driver members 24 that is effected by the aforesaid reciprocation of plunger 28b, however, is a separate motion.

Specifically a horizontally, inwardly directed motion of plate 28 is effected by plunger 28b at the time screw members are driven home; this motion takes place only after the down and in motion of the entire head and motor assembly has been completed. Then, before the upward and outward return stroke of the head and motor assembly occurs, plunger 28b displaces plate 28 and hence motor 26 and drivers 24 outwardly or to the right in FIGS. 2 and 6.

Reference numerals 27 and 29 in FIG. 1 denote an upstanding plate upon which motor 26 is mounted and a gear housing, respectively.

The upper end of lever lock 18 is pivotally received within clevis 30a which clevis is carried by telescoping member or plunger 31 of up-down cylinder 30. The retraction of air from cylinder 30 and addition of air thereinto effects upward and downward travel, respectively, of plunger 31.

It is important to note that slide bar 22 is tilted slightly from the vertical as shown in FIG. 2; thus, driver guide bar 25 and plate 28 are tilted slightly from the horizontal as shown.

Up-down cylinder 30 is tilted an opposite direction from the vertical as depicted; accordingly, downwardly directed travel of plunger 31 will effect downward travel of lever lock member 18, idler shaft 17 and pivot shaft 19, and hence of head 21, motor 26 and associated parts, until down limit means 22a of slide bar 22 stops said downward travel.

Importantly, however, plunger 31 continues its downward stroke after limit means 22a has stopped further downward travel of slide bar 22 and all parts suspendedly supported by it.

Due to the oppositely tilted orientation of slide bar 22 and up-down cylinder 30, a cam over center-type of motion then occurs. Arrow 18a in FIG. 2 indicates the direction of rotation that lever lock member 18 must undergo under the influence of plunger 31 after the down limit has been reached; such rotation displaces pivot shaft 19 to the left in FIG. 2 and since pivot shaft 19 is pivotally secured at its opposite ends to head member side walls 20a, 20b as aforesaid, head block member 23, driver guide bar member 25 and all of the above-described interconnected parts follow such motion. This motion is the "inward" motion portion of the downward and inward travel of said parts that takes place prior to the separate horizontal motion of motor 26 under the control of in-out cylinder 28a referred to hereinabove.

The fully rotated position of lever lock 18 depicted in FIG. 6 is a cam over center locked position; a counterclockwise force on lever lock 18 would be resisted by the rotated position of lever lock member 18 relative to idler shaft 17 as those skilled in the mechanical arts will appreciate from an inspection of said FIG. 6.

The means whereby screws are delivered to head 21 for final application as depicted in FIG. 6 will now be described.

Referring therefore to the upper portion of FIG. 1, hopper member 32 is shown to have an opening 33 into which a supply of screw members 39 is charged; the supply is added to as the machine operates over time. No care need be taken to deposit the screws into the hopper in any particular fashion as one of the important teachings of this invention is that randomly oriented screw members may be individually lifted out of a pile of screws and properly aligned for transportation out of the hopper in the absence of human intervention.

Once lifted from hopper 32, screws are fed to transfer tubes 34 via tracks 35, as will be more fully described hereinafter. Tubes 34 deliver the screws to head 21 when said head is in its up and out position as shown in FIG. 2; no screws travel through tubes 34 when head 21 is in its down and in position, FIG. 6, because when in said position, head 21 is separated from the discharge ends of tubes 34 as is clear from a comparison of FIGS. 2 and 6.

One of the screw-lifting means can be seen in FIG. 2 and is denoted 36; it is positioned within hopper 32 as shown. There are as many lifting members as there are tracks 35 and transfer tubes 34, which number on the preferred embodiment of the invention is six as aforesaid because a typical hinge requires six screws, i.e., three to attach a first hinge flap to a door, and three to attach a second hinge flap to a door jamb.

Each lifting means 36 is a solid member positioned in an upright disposition as depicted in FIG. 2; a slot 36a is formed in the uppermost end thereof as shown and it is this slot that engages the head of a screw and lifts it, it being understood that the shank portion of the screw fits into the slot whereas the head thereof is lifted by the unslotted portion 36b of the solid member. Screw 39a is depicted being lifted upwardly out of the pile 39 whereas a screw 39b is depicted at the top of the stroke of a lifting member 36.

Each lifting member 36 vertically reciprocates responsive to reciprocation of plunger 36c of lifter cylinder 36d. The speed of the oscillation can be increased or decreased as desired over a broad range of oscillations per minute; in the preferred embodiment, the lifting means reciprocates every 5-8 seconds.

It should be understood that the top edge 36b of the lifting means 36 must recede or burrow into the pile of screws 39 in order to engage a screw head and lift the same out of the pile, i.e., the lowermost position of lifting means top edge 36b must be a position below the top of the pile of screws. In order to be able to engage screws even when hopper 32 is nearly empty, the lowermost position of lifter member 36 must bring the respective top edges 36b thereof down to the plane of the bottom of said hopper 32.

A screw lifted by lifting means 36 will be carried by its head to the uppermost position of lifting means 36 and it is this uppermost position that is depicted in FIG. 2 at 39b. The width of slot 36a is less than the diameter of a screw head, as aforesaid, but is greater than the diameter of the shank or threaded portion of a screw so that a screw having its head lifted by the lifting means will not jam in slot 36a.

A horizontally disposed, elongate hopper blow tube 37 is provided with equidistantly spaced perforations 37a along its extent as depicted. Each perforation 37a is adjacent the uppermost position of its associated lifting means 36 so that when air is blown into blow tube 37 by suitable means and hence out each perforation 37a, any screw in position 39b, i.e., any screw having its head resting on the uppermpost edge 36b of a lifting means 36 at the top of its stroke, will be dislodged therefrom and blown onto its associated downwardly inclined track 35.

Due to the length of each track 35, said tracks serve as screw reservoirs and it matters not whether a lifting means 36 successfully engages a screw head during each of its trips into and out of the pile; screws successfully lifted will form a queue along their associated track 35 so no problem occurs whenever a lifting means completes a dip into the pile of screws and comes up "empty handed." The random orientation of screws in the pile, and the stirring thereof by a lifting means even when it unsuccessfully burrows thereinto, ensures that enough successful engagements will occur to keep tracks 35 reasonably full at all times so that head 21 receives a steady, uninterrupted flow of screws.

The screws lifted out of the pile are ultimately delivered to the upper or charging ends of their associated transfer tubes, collectively designated 34 as aforesaid, by a plurality of said downwardly inclined, parallel track members 35. Each track 35 includes elongate transversely spaced arms that supportingly and slideably engage the heads of the screws but not the shank portions thereof.

The charging ends of the transfer tubes 34 are positioned below an escapement member designated 38 as a whole. The function of the escapement member 38 is to transfer individual screws from their respective tracks 35 to their respective transfer tubes 34.

Each track 35 includes a track cover 35a to hold the screws in the track and a track base plate 35b.

Figure 3:
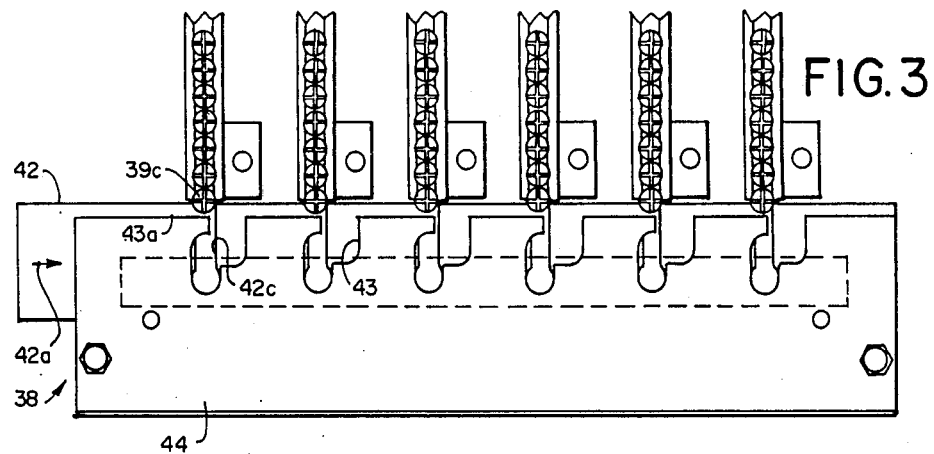
FIG. 3 is a top plan view showing the novel escapement mechanism that transfers screws from their respective tracks to their respective transfer tubes.
Figure 4:
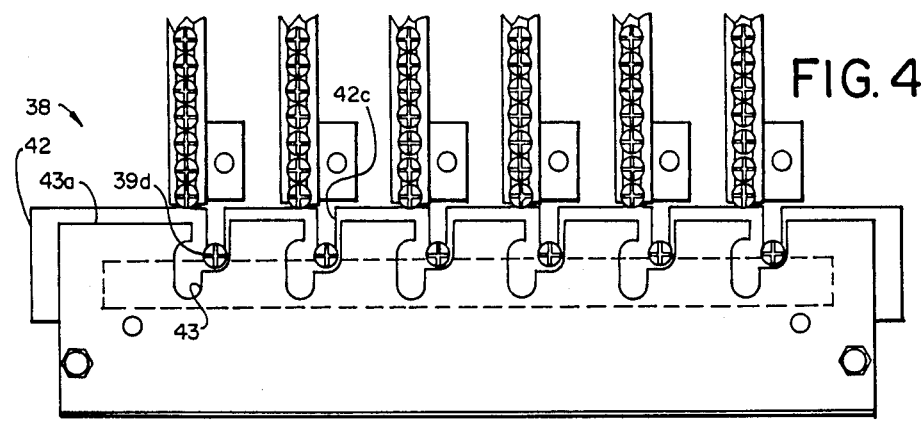
FIG. 4 is a top plan view of the same mechanism shown in FIG. 3, with the bottom plate of the escapement displaced to the right relative to its FIG. 3 position.
Figure 5:
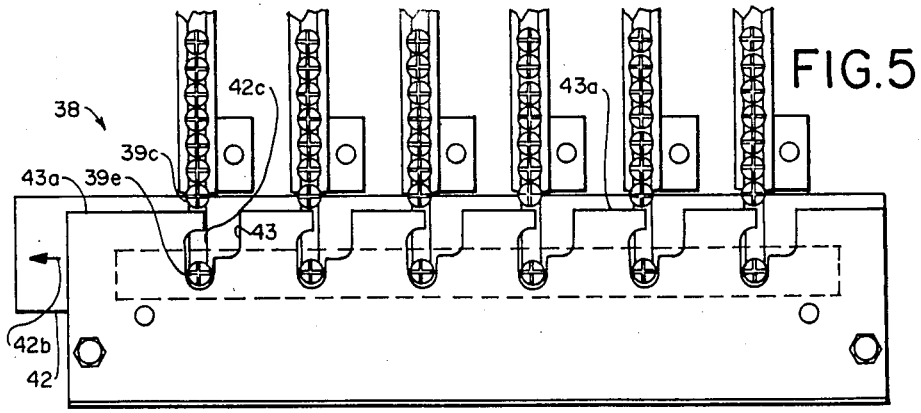
FIG. 5 is a top plan view of the same mechanism shown in FIG. 4, with the bottom plate displaced to the left relative to its FIG. 4 position; the FIG. 5 position thus is the same as the FIG. 3 position but it shows how a screw has advanced from its track to its transfer tube attendant lateral reciprocation of the bottom plate.

FIGS. 3-5 depict escapement member 38 which includes flat plate 44, having slot 43 formed therein, and flat plate 42, having slot 42c formed therein; plate 44 overlies plate 42.

The cycle of operation of escapement 38 includes a repeating laterally directed oscillation of flat plate 42 as indicated by the directional arrows 42a (FIGS. 3) and 42b (FIG. 5). This oscillation alternately aligns and misaligns slots 43 and 42c in the manner now to be described.

In FIGS. 3 and 5, a screw 39c is shown partially received into slot 42c formed in plate 42; leading edge 43a of plate 44 blocks said screw from falling further into slot 42c.

Slot 43 has a first or truncate portion and a second or offset portion, and the collective depth of said first and second portions is substantially equal to the depth of their associated slots 42c as shown by FIGS. 3-5.

When plate 42 moves to the right as denoted in FIG. 3, a screw is free to fall further into slot 42c, but due to the offset form of slot 43, it can fall only to the position designated 39d in FIG. 4. Slot 42c is at that time misaligned with the next screw in position 39c, thereby preventing said following screw from entering into slot 42c.

Subsequent travel to the left of plate 42 as depicted in FIG. 5 will carry a screw in position 39d in FIG. 4 to position 39e in FIG. 5. When a screw assumes position 39e, slot 42c re-aligns with a track 35 and another screw may drop slightly into said slot 42c as denoted by position 39c in FIGS. 3 and 5, being retained from dropping all the way into said slot 42c by the presence of leading edge 43a as aforesaid so that the above-described cycle can repeat.

Escapement blow tube 40, shown in cross section in FIG. 2 and shown in phantom lines in FIG. 1, is similar in structure to hopper blow tube 37. Air blown into it escapes from longitudinally spaced ports and blows each screw that attains position 39e down its associated transfer tube 34 to head 21.

FIGS. 2 and 6 show successive positions of a single screw as it travels from the discharge end of its transfer tube, position 39f, to its final seated position 39h (FIG. 6) by intermediate position 39g (FIG. 2) which is shown for illustrative purposes only; the screw does not stop at position 39f. Air from blow tube 40 propels it all the way to chamber 49 in one continuous motion.

As shown in FIG. 2, bore 49a formed in head block member 23 (there being six of said bores) is in communication with the lowermost or discharge end of its associated transfer tube 34 when head member 21 is in its up and out position.

It will be noted that bores 49a are confluent with bores 23a formed in head block member 23 so that driver members 24 entering bores 23a attendant operation of in-out cylinder 28a are operative to engage the heads of screws deposited in chambers 49.

The means for holding the hinge to be fastened will now be described.

Post 51 of hinge 50 is positioned in slot 52 formed in hinge holding member 23b which member is fixedly secured to head block member 23.

Flaps 50a, 50b of hinge 50 overlie sloping sidewalls 52a, 52b (best seen in FIG. 6) when the screws 39 are ready to be driven.

When head 21 moves to its fully down and in position, which position is depicted in FIG. 6, flaps 50a, 50b will be brought to bear against the respective hinge pockets formed in door 50c and jamb 50d and this will straighten out hinge 50 as is perhaps best understood by comparing the position of flaps 50a, 50b in FIG. 2 with their respective positions in FIG. 6.

Magnets 54a, 54b hold hinge flaps 50a, 50b in place, respectively, in their FIG. 2 position.

A plurality of spring-loaded smooth spherical members (steel balls), collectively designated 53, serve to center screws 39 as they are driven home by driver members 24. In the preferred embodiment, the number of steel balls per screw is four, and they are equidistantly and circumferentially spaced with respect to one another.

The spring-loading urges each ball member radially inwardly; an O-ring member provides the biasing means for each set of ball members (there being six (6) sets). Thus, the resiliency of the O-ring members allows them to expand slightly as a screw exits hinge holding member 23b.

FIG. 2 depicts a screw 39g as it is positioned after being deposited into chamber 49 via bore 49a which extends between chamber 49 and the discharge end of its associated transfer tube 34 as aforesaid; the encircling of the exit of chamber 49 by said spring-loaded spherical members 53 ensures that the tip of the screw will slide freely out of chamber 49 and that the screw will be properly centered with respect to a hole formed in a hinge flap during the driving procedure.

Since the position of transfer tubes 34 never changes throughout the cycles of machine operation, the long life of said tubes 34 is ensured.

The novel lifting means and the novel lever action disclosed herein represent advances in the art of door hinge applicator machines. The specific parts shown can be freely substituted with other parts and different arrangements of the same will also be apparent to those skilled in the art of machine design, now that the preferred structure has been disclosed. Changes that are obvious to those skilled in the art are covered by the claims appended hereto.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A machine that simultaneously fastens hinge flaps of a door hinge to a door and an associated door jamb held at a predetermined position relative to said machine, said machine including: a plurality of transfer tube members, each having a discharge end in a vertically fixed position relative to said door and associated door jamb, said tube members for transferring a plurality of screw members from a hopper to a head member; and linkage means for moving the head member between a first, upward and outward position at the discharge end of said transfer tube members for each cycle of machine operation and a second, downward and inward position where the hinge is fastened to said door and jamb.

2. The machine of claim 1, wherein said linkage means comprises:
   an idler shaft member mounted for reciprocation in a vertical plane;
   a slide bar member mounted for reciprocation in a vertical plane;
   said idler shaft member and said slide bar member reciprocating conjointly with one another;
   a head member depending from said slide bar member and hence also being reciprocable in a vertical plane conjointly with said idler shaft member and said slide bar member;
   and an up-down cylinder member for effecting vertical reciprocation of said idler shaft member and hence of said head member and said slide bar member.

3. The machine of claim 2, further comprising a lever lock member carried by said idler shaft member, said idler shaft member providing a fulcrum means for said lever lock member.

4. The machine of claim 3, wherein said air cylinder member includes a plunger member and wherein said plunger member is pivotally connected to an upper end of said lever lock member.

5. The machine of claim 4, further comprising a pivot shaft member, and wherein a lower end of said lever lock member is fixedly secured to said pivot shaft member.

6. The machine of claim 5, wherein the opposite ends of said pivot shaft member are pivotally secured to said head member.

7. The machine of claim 6, wherein said upper end of said lever lock member is positioned upwardly and outwardly with respect to said fulcrum means and wherein said fulcrum means is positioned upwardly and outwardly with respect to said lower end of said lever lock member.

8. The machine of claim 7, further comprising a down limit means for limiting the downward travel of said head member.

9. The machine of claim 8, wherein said lever lock member rotates in a direction whereby it causes said head member to move inwardly only when said limit means has limited the downward travel of said head member.

10. The machine of claim 9, further comprising:

a first pivot point defined by the pivotal interconnection of said plunger member and said upper end of said lever lock member;

a second pivot point defined by the fixed interconnection of said lever lock member and said idler shaft member;

and a third pivot point defined by the pivotal interconnection of said pivot shaft member and said lower end of said lever lock member;

said first pivot point being positioned upwardly and outwardly with respect to said second and third pivot points;

and said second pivot point being positioned upwardly and outwardly with respect to said third pivot point;

whereby downward travel of said plunger member effects downward travel of said idler shaft member and said head member until a lowermost position thereof is reached, whereupon said lever lock member is constrained to rotate about its fulcrum means attendant continued downward travel of said plunger arm;

said rotation of said lever lock member being inward due to the positioning of said first, second and third pivot points.

11. The machine of claim 10, wherein an uppermost and outwardmost position of said head member brings it into open communication with the respective discharge ends of said transfer tube members, and wherein a lowermost and inwardmost position of sad head member brings it into registration with a door and a door jamb.

* * * * *